Sept. 7, 1965 F. W. ETCHEVERRY, JR 3,205,301

WIDE BAND RECORDING SYSTEM

Filed Aug. 4, 1961 2 Sheets-Sheet 1

INVENTOR:
Frederic W. Etcheverry, Jr.
By Keith D. Beecher
Attorney

Sept. 7, 1965 F. W. ETCHEVERRY, JR 3,205,301

WIDE BAND RECORDING SYSTEM

Filed Aug. 4, 1961 2 Sheets-Sheet 2

INVENTOR:
Frederic W. Etcheverry, Jr.
By Keith D Beecher
Attorney

United States Patent Office 3,205,301
Patented Sept. 7, 1965

3,205,301
WIDE BAND RECORDING SYSTEM

Frederic W. Etcheverry, Jr., 2235 Kelton Ave., Los Angeles, Calif.
Filed Aug. 4, 1961, Ser. No. 129,365
6 Claims. (Cl. 178—6.6)

The present invention relates to recording and reproducing systems, and it relates more particularly to an improved wide band recording and reproducing system suitable for recording video signals and other wide band information.

Attempts to record wide band signals, such as video signals, on tape have met with many problems which, only recently, have been solved to any material extent. The video bandwidth, for example, is much wider than that which a usual audio tape recorder is capable of handling. Moreover, the high frequencies involved in video signals make such recordings even more difficult. The basic difficulty in recording wide band signals on tape is due to the tape itself, and to the associated recording and reproducing heads. These components, together, limit the band of frequencies which can be recorded on the tape.

Early in the prior art, attempts were made to record video information on a magnetic tape by splitting the video signal into a plurality of frequency components. Each of these frequency components extended, for example, through a frequency band of 1 megacycle. The high frequency bands were then heterodyned down to the 1 megacycle range, and each band was recorded in a separate track on the tape. This prior art system, however, required excessively high tape speeds and excessively large reels of tape.

Because of the drawbacks inherent in the system mentioned in the preceding paragraph, the system has largely fallen into disuse.

Present-day systems in widespread use, as will be described, can handle a range of approximately ten octaves. To adapt a usual video signal, which normally extends through a range of over eighteen octaves, into the ten octave range, the present-day magnetic recording systems translate the video information into a vestigial sideband, frequency modulated signal extending through a frequency range of approximately 1–7 megacycles. This use of frequency modulation is further advantageous in that it permits recording of all the components of the signal near the saturation level of the tape so as to improve the signal-to-noise ratio in the system.

To obviate any necessity for the tape to move at an excessively high speed, it is the usual practice in the present-day prior art systems to rotate the read/record transducing head so that it effectively describes a path transversely across the tape as the tape is drawn across the head. This results in a plurality of parallel tracks extending transversely across the tape. It is also usual prior art practice to use a rotating multiple-head arrangement for this purpose.

The use of such a mechanically rotating head, or multiple-head, in the prior art systems has produced serious problems. For example, difficulties have been encountered in producing adequate synchronization, and this has entailed elaborate techniques and instrumentalities. Also, there is a problem of feeding the signal to the rotating head, or multiple-head, during the recording operation, and of obtaining a signal therefrom during a playback reproducing operation. The solution of this problem has required a relatively complex system by which, for example, all the rotating heads are fed with the video signal simultaneously for recording, and in which the heads are sequentially activated for reproducing purposes.

Full details of the prior art types of wide band video magnetic tape recording systems referred to in the preceding paragraphs, may be found, for example, in a recent text entitled "Video Tape Recording" by Julian L. Bernstein, published 1960 by John F. Rider, Inc. of New York.

The present invention, like the above-mentioned prior art systems, is also concerned with recording a wide band signal, such as the present-day video signal, on a tape vehicle. Moreover, the recording of the present invention is carried out, as in the prior art systems, by causing the information to be recorded in a plurality of transverse tracks on the tape, so as to preclude any necessity for excessively high tape speeds.

However, in the system of the present invention, the transverse-track recording and reproduction is carried out without any need for mechanically moving transducing heads, so that the above discussed drawbacks and limitations inherent in the prior art systems using such moving heads are successfully avoided.

The system of the present invention also is adapted to utilize a frequency modulated signal of the vestigial side band type. However, instead of applying this signal directly to a rotating single, or multiple transducing head assembly; the signal is applied, in accordance with the concepts of one embodiment of the invention to be described, to a cathode-ray tube so as to modulate the cathode-ray beam developed in the tube. The modulated cathode-ray beam is then caused to scan in such a manner as to provide a succession of transverse recording tracks on a tape drawn past a transducing head of which the cathode-ray tube is a component part.

In the embodiment to be described, electrostatic recording is used, and for that purpose, the recording tape is formed of a material which is capable of retaining an electric charge after the charging source has been removed. An appropriate material for this purpose is the material commonly referred to as an "electret"; however, other suitable materials may be used.

An electret is a mixture of certain dielectric materials which has been cooled to solidification in a strong electric field. The electric field causes the molecules of the dielectrics to become polarized in the direction of the field. The result is that at room temperature, one surface of the electret has a negative charge and the other surface has a positive charge. The amount of this charge is a direct function of the strength of the electric field producing the charge.

If one surface of the electret is covered with a metal foil "keeper," the electric charges on its opposite surface do not decay appreciably with the passage of time. A description of electrets, and of how they may be conveniently manufactured, can be found in an article entitled "Improved Electrets" at page 20 in "Radio Electronics" for April 1949.

The electret is the electrical analogy of the permanent magnet. A keeper on a permanent magnet maintains the direction of the internal magnetic field inside the permanent magnet. Similarly, the metal foil keeper on an electret maintains the direction of the internal electric field inside the polarized dielectric, so that the electret may retain its surface charge indefinitely.

In the embodiment of the invention to be described, an electret is formed into a tape, analogous to the video-type magnetic tape; and a conductive coating is placed on one side of the electret tape. The electret tape is then drawn across a transducing head constructed in accordance with the concepts of the invention with the conductive coating being disposed on the side of the tape remote from the surface of the head.

Prior to the passage of the electret tape past the transducing head, it is subject to, for example, dielectric heating so that all previous charges may be removed. The tape is then subjected to localized electric fields representative of the signals to be recorded on the tape. As the tape passes the head, the charges are retained on the surface of the tape with an intensity corresponding to the instantaneous values of the signals applied to the transducing head. The conductive coating on the opposite surface of the tape serves as the keeper, so that the charges are retained indefinitely on its first surface.

A ground plate engages the conductive coating on the opposite surface of the electret tape. As the tape is drawn past the transducing head, the cathode-ray beam is successively scanned in a direction transverse to its path. As the beam is so scanned, it forms, in a manner to be described, a plurality of transverse tracks extending across the tape, and each containing localized charges representative of the signal to be recorded. The conductive coating in its engagement with the ground plate forms a plurality of capacitors in the transverse tracks, and these capacitors are individually charged to form the charges on the surface of the tape. The charge on each of the individual capacitors represents the instantaneous value of the frequency modulated signal which is applied to the cathode-ray tube to modulate the cathode-ray beam. These charges, as mentioned above, are retained indefinitely on the surface of the electret tape.

As noted above, prior to the passage of the electret tape across the head in the embodiment of the invention under consideration, a radio frequency generator is used to produce dielectric heating of the tape. This causes the previous signal to be deleted from the tape due to its polarizing effect, and also heats the tape so as to place it in a condition to receive the new signal as it passes the head.

Vacuum means may be provided to retain the tape in close proximity to the head, as will be described, and this vacuum means may also be used to clean dust and lint from the tape.

An object of the invention, therefore, is to provide an improved wide band recording system in which high frequency, wide band signals may be recorded and reproduced in an improved and simplified manner.

Another object is to provide such a system in which such wide band recording and reproduction is effectuated without the need for mechanically moving heads or excessively high tape speeds.

The wide band data is recorded by the above-mentioned frequency modulation method to permit a desired wide band of high frequency signals to be recorded on the tracks of the electret tape, as mentioned above. Also, the associated frequency modulation read-out system used for playback provides desired amplitude limiting action which eliminates spurious variations in the output signal due to variations in tape characteristics.

The features of the invention which are believed to be new are set forth in the attached claims. The invention itself, however, together with further objects and advantages, may best be understood by reference to the following description, when taken in conjunction with the accompanying drawings, in which:

Figures 1, 2:
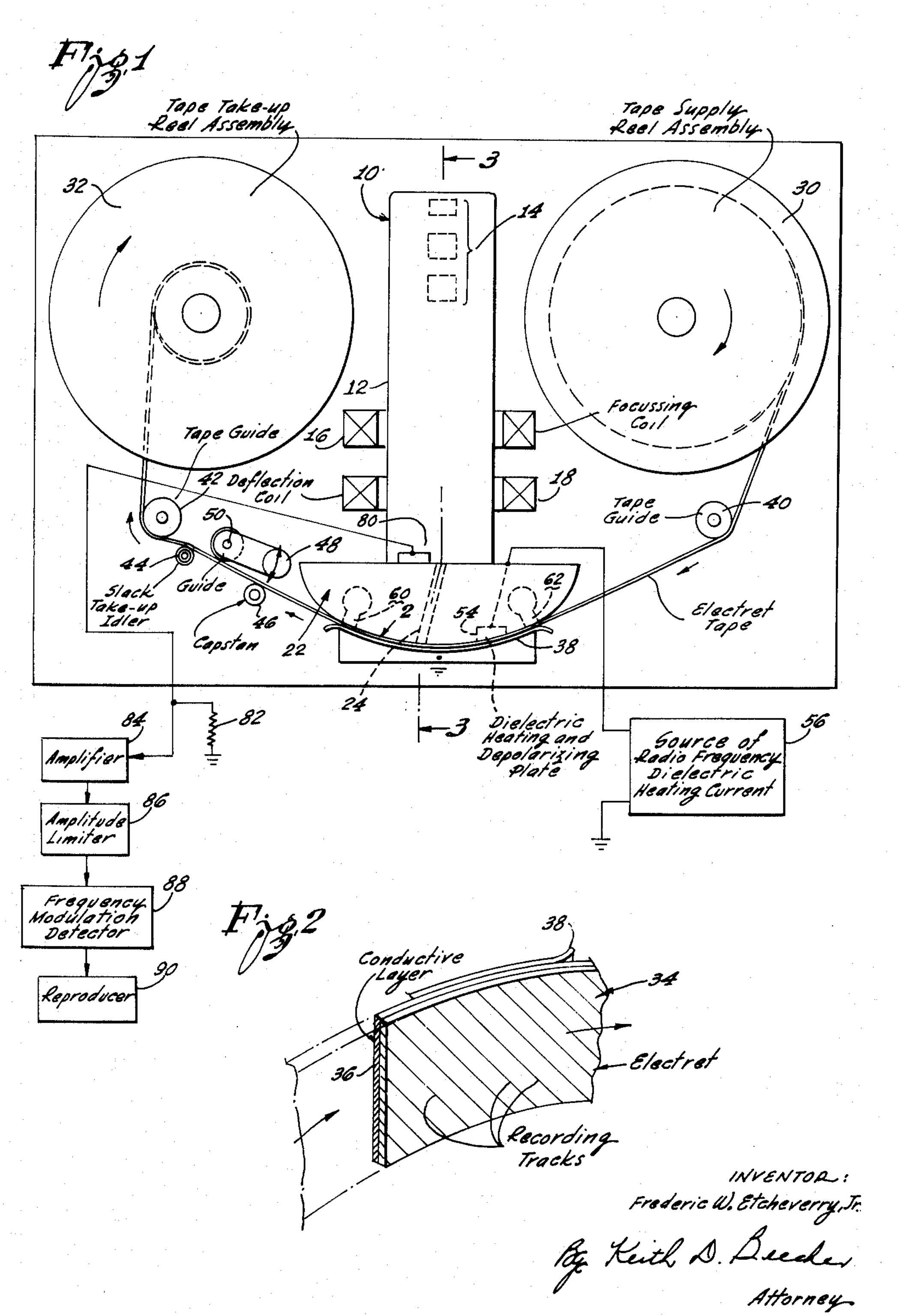
FIGURE 1 is a schematic representation of a recording system and apparatus incorporating the concepts of the present invention.
FIGURE 2 is a fragmentary perspective view of a recording tape suitable for use in the apparatus and system of the invention.

Referring now to the drawings for a more complete description of one embodiment of the invention, it will be observed that the illustrated system and apparatus includes a cathode-ray tube 10. The cathode-ray tube includes a usual evacuated envelope 12. Positioned at one end of the tube is an electron gun 14. The electron gun includes the usual cathode, modulating grid and accelerating grid.

The electron gun 14 forms a cathode-ray beam within the envelope 12, and this beam is focused by a usual focusing coil 16 which is mounted on the neck of the cathode-ray tube. The beam is then scanned along a given axis by a deflection coil 18, or other suitable beam scanning means. Suitable exciting potentials are introduced to the various electrodes of the electron gun 14, and to the focusing coil 16. These connections are extremely well known to the art, and are not shown. A suitable deflection signal source 20 (FIGURE 3) supplies a signal to the deflection coil 18, so that the cathode-ray beam in the cathode-ray tube 10 may be recurrently scanned along the given axis.

In accordance with the present invention, a recording head structure 22 is mounted on the end of the cathode-ray tube 10 remote from the electron gun 14. The head structure 22 may be composed, for example, of plastic or any other suitable material. A plurality of rectangular, elongated electrically conductive strip members 24 are embedded in the head structure 22, and these strip members extend from the interior of the envelope 12 to the lower surface of the head structure 22. The electrically conductive members 24 are disposed in spaced, parallel, mutually insulated relationship (FIGURE 4); and they extend along the given axis referred to above.

It will be appreciated that the electrically conductive members 24 extend from the interior of the envelope 12 to the exterior to terminate at the lower surface of the head structure 22. As the cathode-ray beam in the cathode-ray tube 12 is recurrently scanned across the given axis, it successively engages the interior portions of respective ones of the conductive members 24.

As shown in FIGURE 1, the illustrated embodiment of the invention may include a supply reel assembly 30, and it also includes a tape take-up reel assembly 32. A tape 34 is coiled around the supply reel assembly 30, and this tape is drawn past the head 22 and recoiled around the take-up reel 32.

The tape 34 is preferably composed of an electret, as shown in FIGURE 2. As mentioned above, the electret is capable of assuming a localized charge after the charging source has been removed, and of retaining the charge indefinitely. A conductive layer 36 is formed on the lower surface of the tape 34. The conductive layer 36 serves as a keeper for the charges on the upper surface, and it also serves to contact a ground plate 38, for reasons to be described.

The tape 34, as it leaves the supply reel 30 passes over a tape guide 40 and across the lower face of the head 22 between that face and the ground plate 38. The ground plate is positioned in facing relationship with the head 22 but spaced from the head, so that the tape 34 passes between the lower surface of the head and the ground plate as it is drawn along its path.

The tape passes over a further tape guide 42, and also over a usual slack take-up idler 44. The tape is driven along its path by a capstan 46, for example, in accordance with usual practice, and a pinch roller 48 is controlled in known manner to engage the tape and cause it to be driven by the capstan 46 when such a drive is desired. The pinch roller 48 is pivoted to a further guide 50 across which the tape moves along its path to the take-up reel 32.

The conductive members 24 extend through the head 22, as described above, to engage the upper surface of the tape 34 in transverse relationship with that surface. Then, as the members 24 are successively and cyclically activated by the cathode-ray beam in the cathode-ray tube 10, they produce a series of diagonal recording tracks across the upper surface of the tape 34, as shown in FIGURE 2.

An electrically conductive plate 54 is embedded in the head 22 to present a conductive face to the tape 34 prior to the engagement of the tape by the exterior portions of the conductive members 24. The plate is connected to a source 56 of radio frequency dielectric heating current. The source 56 introduces a high frequency potential between the plate 54 and the ground plate 38.

Then, as the electret tape 34 passes over the plate 54, this potential creates a high frequency current in the electret tape which depolarizes and heats the tape. The electret tape 34 is, therefore, placed in condition such that previous recordings have been erased, and the tape is in a heated condition capable of receiving new recordings, as it passes under the extremities of the conductive members 24.

A pair of openings 60 and 62 may also be provided on the lower surface of the head 22. Appropriate lines 64 couple the openings to a suitable vacuum pressure source. The resulting vacuum pressure produced at the openings 60 and 62 causes the tape 34 snugly to engage the surface of the head 22, and also serve to clean lint, dust and other foreign matter from the surface of the tape.

Figures 3, 4:
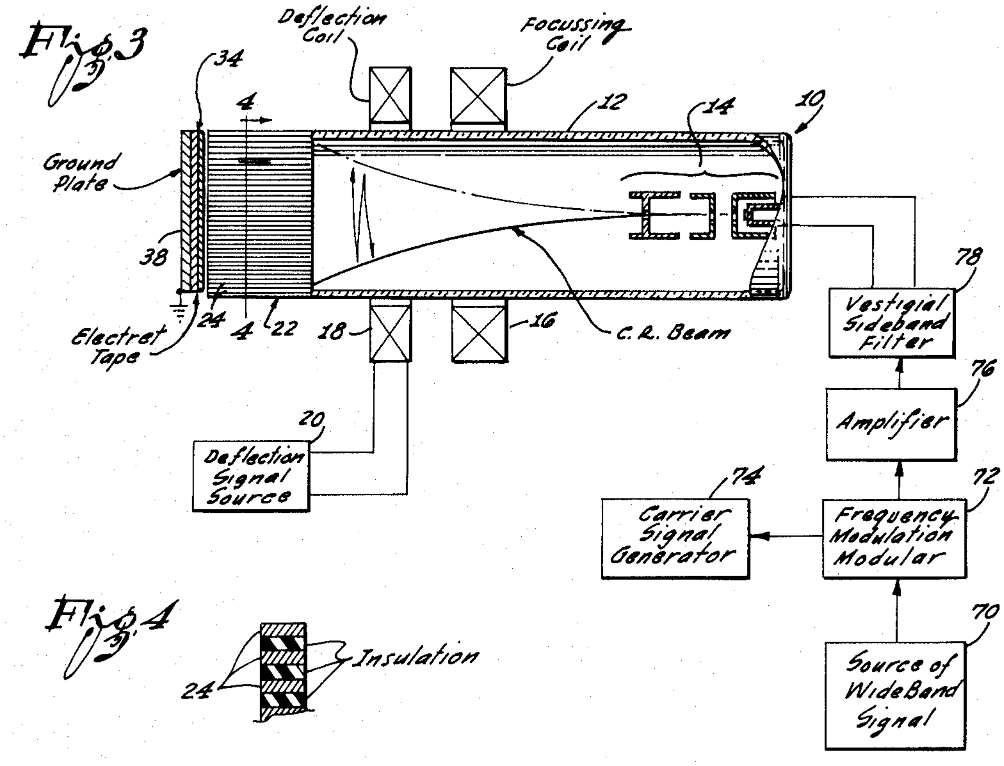
FIGURE 3 is a schematic and block representation of the system and apparatus of the invention and of various electrical and electric components associated therewith and includes a sectional view of the apparatus of FIGURE 1 taken along the line 3—3 of FIGURE 1.
FIGURE 4 is an enlarged, fragmentary sectional view taken along the lines 4—4 of FIGURE 3.
Figure 5:
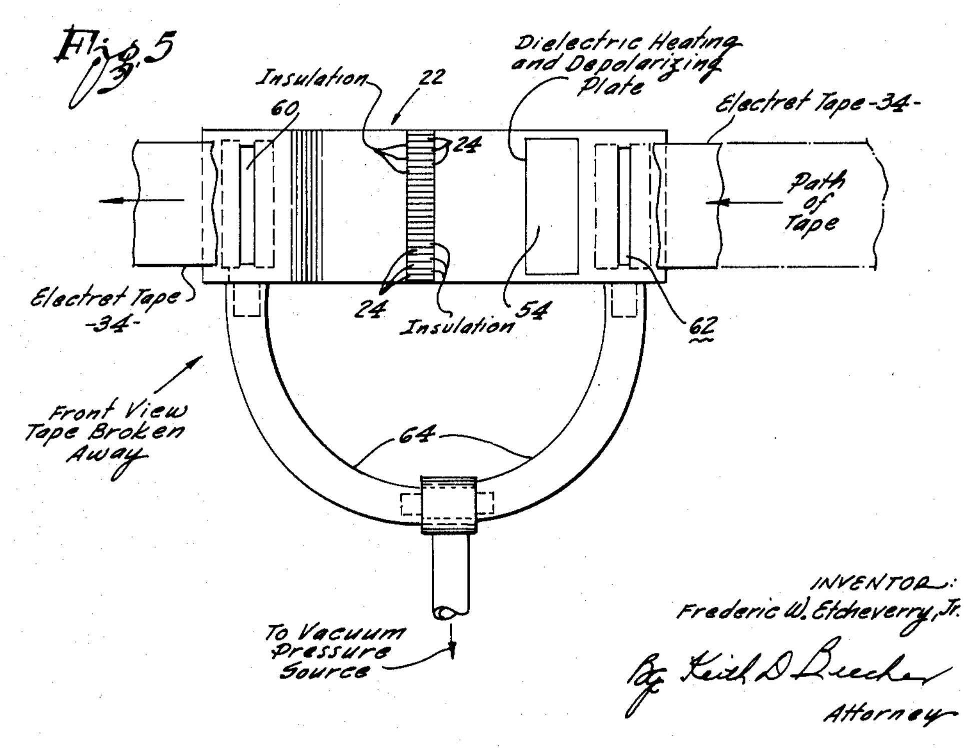
FIGURE 5 is a schematic diagram of a recording head constructed in accordance with one embodiment of the invention, as viewed from the bottom of the head.

For recording purposes, and as shown in FIGURE 3, the source of the wide band signals 70 (which are to be recorded) is coupled to a frequency modulation modulator 72. A carrier signal generator 74 is also coupled to the modulator, and the signal from the carrier signal generator is frequency modulated by the intelligence to be recorded. The resulting frequency modulated carrier is amplified in an amplifier 76, and passed through a vestigial side band filter 78 to the control electrodes of the cathode-ray tube 10. The resulting vestigial side band frequency modulated signal modulates the intensity of the cathode-ray beam as the beam is scanned across the inner extremities of the conductive members 24.

At the same time, the electret tape 34 is drawn across the outer extremities of the conductive members 24 in a heated and depolarized condition, after passing across the plate 54. The electret tape 34 forms a plurality of small capacitors between the outer extremities of the conductive strip members 24 and the ground plate 38, and the incidence of the cathode-ray beam on successive ones of the conductive strip members 24 causes corresponding individual charges to appear on the upper surface of the electret tape 34 along the successive diagonal recording tracks shown in FIGURE 2.

This results in a recording of the frequency modulated signal on the tape 34. Any desired resolution may be achieved by choosing the number of individual strip conductive members 24. As is well known, the application of usual printed circuit techniques can result in an extremely small size in the individual strip members 24, and of a correspondingly large number of the members for each transverse recording track. In this manner, extremely high resolution may be achieved.

For playback purposes, the depolarizing plate 54 (FIGURE 1) is de-energized, and the cathode-ray beam is scanned across the strip members 24 in an unmodulated condition as the electret tape 34 is passed under the members. As the cathode-ray beam scans successive ones of the strip members 24, secondary emission effects are created, and these effects are a function of the different charges along the recording tracks of the tape 34.

A collecting plate 80 (FIGURE 1) is provided at the end of the cathode-ray tube remote from the electron gun 14, and this plate is connected, for example, to a grounded resistor 82. The secondary emission current from the successive conductive members 24 flows through the resistor 82 to reproduce a frequency modulated signal across the resistor 82 corresponding to the intelligence recorded on the tape 34. This signal is applied to an amplifier 84, and the amplified signal is amplified by an amplitude limiter 86 and detected in a usual frequency modulation detector 88. The resulting intelligence, either visual or audible, is reproduced by a suitable reproducer 90.

The various electronic components of the system shown in block form are in themselves well known to the art, and a detailed circuit explanation of these components is believed to be unnecessary.

Although a particular embodiment of the invention has been shown and described, it will be appreciated that modifications may be made, and the following claims are intended to cover all such modifications as fall within the spirit and scope of the invention.

I claim:

1. Wide band recording and reproducing apparatus, including: a cathode-ray tube having a remote end and including means for forming a cathode-ray beam therein and for directing said beam towards said remote end, and further including means for recurrently scanning said beam across said remote end along a given axis; a head structure mounted at said remote end of said cathode-ray tube and having a tape receiving surface; a plurality of mutually insulated electrically conductive members mounted at said remote end of said cathode-ray tube and disposed adjacent one another along said given axis to be successively and cyclically scanned by said beam, said electrically conductive members extending from the interior of said cathode-ray tube through said head structure to said tape-receiving surface; an elongated electret tape recording medium; and transport means for drawing said tape across said tape-receiving surface of said head along a path traversed by said given axis in electrostatically coupled relationship with said electrically conductive members, so that said beam is effectively scanned with respect to said tape in a succession of parallel diagonal paths extending across said tape.

2. Wide band recording and reproducing apparatus including: a cathode-ray tube having a remote end and including means for forming a cathode-ray beam therein and for directing said beam towards said remote end, means for modulating said cathode-ray beam with intelligence to be recorded, and further including means for recurrently scanning said beam across said remote end along a given axis; a recording head structure mounted at said remote end of said cathode-ray tube and having a tape receiving surface; a plurality of mutually insulated electrically conductive members mounted at said remote end of said cathode-ray tube and disposed adjacent one another along said given axis to be successively and cyclically scanned by said beam, said electrically conductive members extending from the interior of said cathode-ray tube through said head structure to said tape-receiving surface; an elongated electret tape recording medium; and transport means for drawing said electret tape across said tape-receiving surface of said head along a path traversed by said given axis in electrostatically coupled relationship with said electrically conductive members so that said beam is effectively scanned with respect to said tape in a succession of parallel diagonal recording paths extending across said tape.

3. Wide band recording and reproducing apparatus including: a cathode-ray tube having a remote end and including means for forming a cathode-ray beam therein and for directing said beam towards said remote end, and further including means for recurrently scanning said beam across said remote end along a given axis; a head structure mounted at said remote end of said cathode-ray tube and having a tape-receiving surface; a plurality of mutually insulated electrically conductive members mounted at said remote end of said cathode-ray tube and disposed adjacent one another along said given axis to be successively and cyclically scanned by said beam, said electrically conductive members extending from the interior of said cathode-ray tube through said head structure to said tape-receiving surface; an elongated electret tape recording medium having an electrically conductive layer formed on one surface thereof; transport means for drawing said electret tape across said tape-receiving surface of said head along a path traversed by said given axis and with said conductive layer disposed on the opposite surface of said tape from that engaged by said tape-receiving surface so that said tape is electrostatically coupled to said electrically conductive members and so that said beam is effectively scanned with respect to said tape in a succession of parallel diagonal paths extending across said tape; and an electrically conductive ground plate disposed adjacent said tape-receiving surface of said head and spaced therefrom to engage said conductive layer on said tape as said tape is drawn across said tape-receiving surface between said head and said ground plate.

4. The combination defined in claim 1 and which includes a dielectric heating plate mounted on said tape-receiving surface of said head structure to engage the surface of said electret tape prior to the coupling thereof with said electrically conductive members, and means for applying a radio frequency signal to said plate to produce heating and depolarizing effects in said tape.

5. The combination defined in claim 1 in which said electrically conductive members produce secondary emission effects when scanned by said cathode-ray beam, as determined by localized electrostatic charges on the surface of said electret tape, and in which said cathode-ray tube includes an electrically conductive collector plate at the end thereof remote from said beam forming means for collecting signals produced by said secondary emission effects; and electrical circuitry coupled to said collector plate for utilizing the signals collected thereby.

6. The combination defined in claim 2 and which includes a source of frequency modulated signals coupled to said modulating means.

References Cited by the Examiner

UNITED STATES PATENTS

| | | | |
|---|---|---|---|
| 2,291,476 | 7/42 | Kernkamp | 346—74 |
| 2,716,048 | 8/55 | Young | 346—110 |
| 2,894,799 | 7/59 | McCreary | 178—6.6 |
| 2,996,573 | 8/61 | Barnes | 178—6.6 |
| 3,040,124 | 6/62 | Camras | 178—6.6 |

DAVID G. REDINBAUGH, *Primary Examiner.*

ROY LAKE, *Examiner.*